United States Patent Office 2,995,539
Patented Aug. 8, 1961

2,995,539
ETHYLENE POLYMER COMPOSITION CONTAINING ALKANOL SULFIDE POLYMER
Harold Clinton Barker and Ernest Eugene Lewis, Wilmington, Del., assignors to E. I. du Pont de Nemours and Company, Wilmington, Del., a corporation of Delaware
No Drawing. Filed Apr. 24, 1958, Ser. No. 730,516
6 Claims. (Cl. 260—45.5)

This invention relates to new compositions of matter and more particularly to new compositions of matter comprising modified polymers of ethylene. This application is a continuation in part of application S.N. 568,700, filed March 1, 1956.

The polymers of ethylene which are included in the compositions of this invention may be made, for example, by the processes of U.S. Patent 2,153,553, British Patent 639,306 and Canadian Patent 510,145, or by other processes for producing normally solid linear or branched chain polymeric products by polymerization of ethylene in the presence of a catalyst suitable for the particular reaction. The term "ethylene polymer" as employed herein also includes the so-called "telomers" of ethylene, which are normally solid and which are obtained by polymerization of ethylene in the presence of a modifying reactant which supplies the end groups for the polymeric chain. A great variety of such modifying agents is known, as disclosed in U.S. Patents 2,402,137, 2,405,950, 2,409,683, 2,440,800, and 2,504,400.

It was known heretofore that ethylene polymers, upon prolonged exposure to sunlight, underwent oxidation and photodegradation reactions which resulted in chemical modifications of the polymeric molecule with a corresponding lowering of tensile strength and impairment of electrical properties; these effects could be suppressed by loading the polymer with a black filler such as carbon black but this was often not desirable; moreover, the efforts which have been made heretofore to overcome these weathering effects by the use of chemical inhibitors have not been completely successful for reasons explained below.

The previously known light stabilizers (other than carbon black) for normally solid ethylene polymers have been relatively ineffective. The number of inhibitors which have been examined in the hope of finding one having the desired combination of properties is extremely great. In U.S. Patent 2,340,938, certain thioether-substituted metal phenolates are disclosed as thermal depolymerization inhibitors; the patent also states that these same substances inhibit degradation by ultra-violet light of polymers normally resistant to oxidation. In U.S. Patent 2,387,518, stabilizers containing a thiocarboxyl function, in which a carbon atom is directly linked to two atoms of a sulfur family element and also to an atom of a non-metallic element in group V of the periodic table, one of the said sulfur family atoms being linked to another sulfur family element, are disclosed. In U.S. Patent 2,434,662, numerous classes of inhibitors including heterocyclic compounds containing annular nitrogen, amines, diphenols, etc. are disclosed. In U.S. Patent 2,435,245, the inhibitor to prevent thermal degradation (which is to be distinguished from photodegradation) is a diphenyl amine-acetone condensation product. In U.S. Patent 2,448,799, metal stearates are disclosed in combination with 2-mercaptobenzothiazole, benzothiazyl disulfide, thiosorbiton, etc. Thiopropionates as stabilizers for polythene are disclosed in U.S. Patent 2,519,755. Introduction of diphenylamine into polythene by means of a lubricant to impart thermal stability is disclosed in U.S. Patent 2,543,329. British Patent 609,177 teaches the use of diphenylamine in preference to thiourea and other thermal stabilizers, and British Patent 618,839 discloses propyl gallate as a light stabilizer for polythene. None of the compounds disclosed in any of the aforesaid patents is a sufficiently effective stabilizer to inhibit oxidative, thermal, and photodegradation of ethylene polymers equal to that effect of the compounds of the invention.

An object of this invention is to provide compositions comprising ethylene polymers which have improved physical properties, and more particularly, improved resistance to weathering. Another object is to provide pigmented ethylene polymers having superior resistance to oxidative degradation. Other objects and advantages of the invention will hereinafter appear.

It has been discovered, in accordance with the present invention, that ethylene polymers are stabilized with an alkanol sulfide polymer such as polymers conforming with these structural formulas—

(1) $(-R_1OR_2S-)_x$
(2) $(-R_1OR_2OR_1S-)_x$
(3)

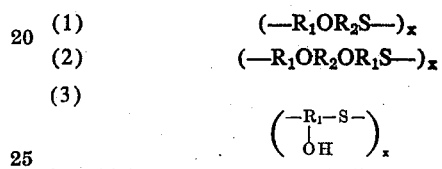

in which $R_1$ and $R_2$ are similar or dissimilar alkylene groups with not greater than four carbon atoms, and $x$ is an integer greater than 4. Moreover, when used with pigments or dyes, the alkanol sulfide polymer modified ethylene polymers possess a resistance to degradation that is synergistic, i.e., the modified polymer has a resistance to degradation greater than the arithmetic sum of the effects of pigments or dyes alone and the alkanol sulfide polymers alone.

The compounds which are especially effective in combination with ethylene polymers according to the present invention, with or without pigments or dyes, are:

(1) Polymers having the formula—

$(-CH_2CH_2-O-CH_2CH_2-S-)_x$

These compounds are called polymers of thiodiethanol and thiodiethylene glycol ether.

(2) Polymers having the formula—

$(-CH_2CH_2-O-CH_2-O-CH_2CH_2-S-)_x$

These compounds are called polymers of mercaptoethylhydroxy ethyl formal.

(2a) Polymers having the formula—

$(-CH_2CH_2-O-CH_2CH_2-O-CH_2CH_2-S-)_x$

These compounds are called polymers of thio-triethylene glycol ether.

(3) Polymers having the formula—

$$\left[ \begin{array}{c} CH_2OH \\ -CH-CH_2-S- \end{array} \right]_x$$

These compounds are called polymers of 1-mercapto-propanediol-2,3.

The polymers of Formula 1 are produced by any suitable process such, for example, by reacting beta,beta'-dichloro diethyl ether with sodium sulfide. The polymers of (2) and (2a) are produced by similar reactions from beta,beta'-dichloro diethyl formal and beta,beta'-dichloro diethyl ether of ethylene glycol respectively. The polymers of Formula 3 are similarly produced from 2,3-dichloro-propane-1.

The quantity of the alkanol sulfide polymer additive which is employed in the practice of this invention is generally within the range of about 0.2 to 5% of the weight of the ethylene polymer, excellent results being obtained when the content of the additive is in the range of about 0.25% to 1.0%. The indicated amounts of the alkanol sulfide polyer are incorporated in the polyethylene by the processes described in U.S. Patent 2,770,608, filed October 12, 1954, and issued November 13, 1956, or by any other suitable method such, for example, as charging a rubber mill at a mill temperature of 140° C., with the polyethylene and, before or after the polyethylene has reached mill temperature, adding the desired amount of the alkanol sulfide polymer. Alternatively, the mixing may be conducted in a Banbury mixer at a temperature between 140–160° C., to which mixture the sulfide is added with or without a solvent.

In practicing and testing the products of the invention, numerous methods have been employed for observing the improved results obtained through the use of the additives of the invention as compared with previously known inhibitors for oxidative degradation of ethylene polymers. A suitable test has been found in weathering extruded monofils of the polymer having a diameter of 45 mils by inclining them at a 45° angle, facing south in Hialeah, Florida, and continuing the exposure for a period of many months. Close examination of the surface of the monofils determines whether or not exudation has taken place. Another test has been the weathering of compression molded slabs. One of the criteria employed in these weathering tests is the time required for changes in elongation of a standard ethylene polymer having an elongation of 600% at the start of the test to 200% at the termination of the test. Experience with this method of testing stabilizers indicates that at the time of termination the change is generally of the order of magnitude of about 20% of the initial tensile strength. Other physical tests are also employed such as the measure of cold brittleness to determine the effectiveness of the stabilizer. For example, when the initial cold brittleness temperature is about −70° C., specimens which develop a cold brittleness temperature greater than 0° C. are regarded as unsatisfactory. When no inhibitor is employed in similar tests, and also when any of the known phenolics are employed as inhibitors, the cold brittleness temperature reaches about +15° C. in about three months. None of the colorless or light-colored ethylene polymers heretofore sold on commercial basis has had properties better in this respect than those exhibited by the ethylene polymers which are inhibited by phenolic inhibitors. In contrast with this, the compositions obtained in accordance with the present invention have cold brittleness temperatures which are generally as low as −50° C. to −70° C. after six months' exposure, and in many cases below −25° C. after 18 months.

The following table shows the extraordinary performance of ethylene polymer compositions containing stabilizers of the invention.

TABLE I

*Effect of Florida outdoor weathering on physical properties of polyethylene containing $^c$ and/or pigments*

| Stabilizer | Life of monofilament in Florida,$^a$ months | Physical properties of compression molded specimens before and after Florida outdoor weathering | | | | | | | | | | | | | | |
|---|---|---|---|---|---|---|---|---|---|---|---|---|---|---|---|---|
| | | Tensile strength $^d$ | | | | | Ult. elongation $^d$ | | | | | Cold brittleness temperature $^e$ | | | | |
| | | Initial, p.s.i. | 6 mos., p.s.i. | 12 mos., p.s.i. | 18 mos., p.s.i. | 24 mos., p.s.i. | Initial, percent | 6 mos., percent | 12 mos., percent | 18 mos., percent | 24 mos., percent | Initial, °C. | 6 mos., °C. | 12 mos., °C. | 18 mos., °C. | 24 mos., °C. |
| None | 3 | 1,800 | 1,660 | 990 | 410 | ------ | 620 | 50 | 20 | 20 | ------ | −80 | +10 | +8 | +20 | ------ |
| (1) 0.5% $^c$ | 9 | 1,540 | 1,390 | 1,460 | 1,530 | 1,110 | 550 | 360 | 10 | <10 | <10 | <−75 | −20 | +12 | +12 | +12 |
| (2) 1.0% $^c$ | 6 | 1,590 | 1,420 | 1,470 | 1,530 | 1,190 | 560 | 540 | 80 | 30 | 10 | −70 | −50 | +10 | +15 | +10 |
| (3) 2.0% $^c$ | 12 | 1,540 | 1,830 | 1,190 | 1,390 | 1,360 | 570 | 580 | 140 | 70 | 10 | −63 | <−70 | −15 | +2 | +12 |
| (4) 4.0% $^c$ | 12 to 15 | 1,610 | 1,820 | 1,680 | 1,210 | 1,350 | 590 | 600 | 520 | 170 | 50 | <−75 | −68 | −48 | −25 | −18 |
| (5) 2.0% $^c$+0.5% cadmium red $^1$ | 24 to 27 | 1,540 | 1,630 | 1,380 | 1,230 | 1,290 | 560 | 560 | 530 | 210 | 60 | −63 | <−72 | −35 | −32 | −18 |
| (6) 2.0% $^c$+0.2% "Monastral" blue $^2$ | 27 to 27+ | 1,590 | 1,530 | 1,490 | 1,410 | 1,120 | 570 | 560 | 500 | 530 | 180 | −70 | −68 | −48 | −45 | −20 |
| (7) 2.0% $^c$+0.2% "Monastral" green $^3$ | 27+ | 1,590 | 1,570 | 1,520 | 1,370 | 1,090 | 570 | 570 | 570 | 480 | 170 | −58 | −48 | −45 | −35 | −28 |
| (8) 2.0% $^c$+0.5% chrome yellow medium $^4$ | 27 to 27+ | 1,660 | 1,630 | 1,480 | 1,300 | 1,240 | 570 | 580 | 570 | 370 | 80 | −68 | −67 | −40 | −28 | −10 |
| (9) 2.0% $^c$+0.5% ZNO | 9 to 12 | 1,660 | 1,750 | 1,350 | 1,400 | 1,210 | 560 | 600 | 40 | 60 | 30 | <−75 | −65 | −25 | −2 | +8 |
| (10) 2.0% $^c$+0.2% Ti$^1$O $^2$ | 9 | 1,680 | 1,470 | 1,110 | 1,130 | 1,330 | 580 | 560 | 130 | 100 | 90 | <−75 | −60 | −35 | −20 | −12 |
| (11) 2.0% $^c$+0.2% cadmium yellow $^5$ | 12 to 18 | 1,680 | 1,710 | 1,590 | 1,300 | 1,500 | 580 | 590 | 530 | 380 | 90 | −58 | <−72 | −45 | −20 | −20 |
| (12) 2.0% $^c$+0.5% brown $^b$ | 27 to 27+ | 1,660 | 1,520 | 1,240 | 1,200 | 1,190 | 620 | 600 | 300 | 120 | 80 | −63 | −65 | −25 | −15 | −15 |
| (13) 1% "Monastral" blue | 6 | | | | | | | | | | | | | | | |
| (14) 1% "Monastral" green | 3 to 6 | | | | | | | | | | | | | | | |
| (15) 1% cadmium red | 6 to 9 | | | | | | | | | | | | | | | |
| (16) 1% cadmium yellow | 6 | | | | | | | | | | | | | | | |

$^a$ Less than 200% elongation considered failure.
$^b$ Dark greenish brown composition made from yellow, red, blue, and channel black stocks.
$^c$ Composition of thio-diethylene glycol ether polymers.
$^d$ ASTM D-412.
$^e$ ASTM D-746-44-T.
$^1$ A mixture of cadmium selenide, cadmium sulfide and barium sulfate.
$^2$ Metal-free phthalocyanin.
$^3$ Highly chlorinated copper phthalocyanin.
$^4$ Lead chromate.
$^5$ Cadmium sulfide.

("Monastral" colors are defined by Concise Chemical and Technical Dictionary, edited by H. Bennett, published by Chemical Publishing Co., Inc., N.Y. (1947), at page 633, as: "Copper phthalocyanine or its derivatives.")
(Cadmium red, chrome yellow, and cadmium yellow are defined as in the above footnotes in Hackh's Chemical Dictionary, 3rd Edition, The Blakiston Company, Philadelphia, Pa. (1944), at pages 155, 198 and 155 respectively.)

While the beneficial stabilizing influence of the alkanol sulfide polymers is shown in Table I, see Examples 1 through 4, the surprising and unexpected increase in that influence is noted in Examples 5 through 12 when dyes and pigments are used. A comparison of the latter group of examples, with the summation of the influence of the stabilizers of Examples 1 through 4 and Examples 13 through 16, clearly establishes the synergism in the combined use of the alkanol sulfide polymers with pigments and dyes.

Table II gives the life span of 45 mil monofilaments exposed in Florida with and without the alkanol sulfide polymers of the invention.

TABLE II

| Exposure No. | Stabilizer | Life of Mono-filaments in Florida, Mos. |
|---|---|---|
| 880 | 0% | 3 |
| | 1% (—CH₂CH₂—O—CH₂CH₂—S—)ₓ of thio-diethylene glycol ether polymers. | 6 |
| 1203 | 1% (—CH₂CH₂-O-CH₂CH₂-O-CH₂CH₂-S-)ₓ of mercaptoethyl-hydroxy ethyl formal polymers. | 6 |
| 1204 | 1% (CH₂CH₂-O-CH₂CH₂-O-CH₂CH₂-S-)ₓ of thio-triethylene glycol ether polymers. | 6 |
| 1205 | 1% $\left[\begin{array}{c} CH_2OH \\ -CH-CH_2-S- \end{array}\right]_x$ of 1-mercapto-propanediol-2,3 polymers. | 9 |

We claim:

1. A composition of matter comprising a normally solid polymer of ethylene selected from the class consisting of linear and branched chain polymeric products of ethylene, and 0.02% to 5.0% by weight, based on the weight of said normally solid ethylene polymer, of a member selected from the class consisting of the polymers:

$$(—R_1OR_2S—)_x$$
$$(—R_1OR_2OR_1S—)_x$$

and $$\left(\begin{array}{c} -R_1-S- \\ | \\ O \\ | \\ H \end{array}\right)_x$$

wherein $x$ is an integer greater than 4, and wherein $R_1$ and $R_2$ are members selected from the group consisting of similar and dissimilar alkylene groups each of which contains no more than 4 carbon atoms.

2. A composition of matter comprising a normally solid polymer of ethylene selected from the class consisting of linear and branched chain polymeric products of ethylene, and from 0.02% to 5.0%, based on the weight of said ethylene polymer, of a polymer having at least 5 repeating groups having the formula:

$$(—R_1OR_2S—)$$

in which $R_1$ and $R_2$ are selected from the group consisting of similar and dissimilar alkylene groups each of which contains no more than 4 carbon atoms.

3. A composition of matter comprising a normally solid ethylene polymer selected from the class consisting of linear and branched chain polymeric products of ethylene, and from 0.02% to 5.0%, based on the weight of said ethylene polymer, of a polymer having at least 5 repeating groups having the formula:

$$\left(\begin{array}{c} -R_1-S- \\ | \\ O \\ | \\ H \end{array}\right)$$

in which $R_1$ is an alkylene group which contains no more than 4 carbon atoms.

4. A composition of matter comprising as the major component a normally solid polymer selected from the class consisting of linear and branched chain polymeric products of ethylene, and from 0.25% to 1.0%, based on the weight of said polymeric product of ethylene, of a polymer having at least 5 repeating groups having the formula:

$$(—R_1OR_2OR_1S—)$$

wherein $R_1$ and $R_2$ are selected from the group consisting of similar and dissimilar alkylene groups each of which contains no more than 4 carbon atoms.

5. A composition of matter comprising a normally solid polymer of ethylene selected from the class consisting of linear and branched chain polymeric products of ethylene, a pigment, and from .02% to 5.0%, based on the weight of said ethylene polymer, of a polymer having at least 5 repeating groups having the formula:

$$(—R_1OR_2OR_1S—)$$

wherein $R_1$ and $R_2$ are selected from the group consisting of similar and dissimilar alkylene groups each of which contains no more than 4 carbon atoms.

6. A composition of matter comprising a normally solid polymer of ethylene selected from the class consisting of linear and branched chain polymeric products of ethylene, cadmium red, and a polymer having at least 5 repeating groups having the formula:

$$(—R_1OR_2OR_1S—)$$

wherein $R_1$ and $R_2$ are selected from the group consisting of similar and dissimilar alkylene groups each of which contains no more than 4 carbon atoms.

No references cited.

UNITED STATES PATENT OFFICE
CERTIFICATE OF CORRECTION

Patent No. 2,995,539　　　　　　　　　　　　　August 8, 1961

Harold Clinton Barker et al.

It is hereby certified that error appears in the above numbered patent requiring correction and that the said Letters Patent should read as corrected below.

Columns 3 and 4, TABLE I, column 1, line 14 thereof, for "ZNO" read -- ZnO --; same TABLE I, column 1, line 15 thereof, for "T$^1$O$^2$" read -- TiO$_2$ --.

Signed and sealed this 26th day of December 1961.

(SEAL)
Attest:

ERNEST W. SWIDER
Attesting Officer

DAVID L. LADD
Commissioner of Patents
USCOMM-DC